US010425499B2

(12) United States Patent
Lee

(10) Patent No.: US 10,425,499 B2
(45) Date of Patent: Sep. 24, 2019

(54) SERVER AND METHOD FOR PROVIDING CONTENT TO USERS

(71) Applicant: Line Corporation, Shibuya-ku, Tokyo (JP)

(72) Inventor: Ilgu Lee, Tokyo (JP)

(73) Assignee: LINE CORPORATION, Tokyo (JP)

( * ) Notice: Subject to any disclaimer, the term of this patent is extended or adjusted under 35 U.S.C. 154(b) by 265 days.

(21) Appl. No.: 14/743,880

(22) Filed: Jun. 18, 2015

(65) Prior Publication Data

US 2016/0373550 A1 Dec. 22, 2016

(51) Int. Cl.
*H04L 29/08* (2006.01)

(52) U.S. Cl.
CPC ........ *H04L 67/327* (2013.01); *H04L 67/2842* (2013.01)

(58) Field of Classification Search
None
See application file for complete search history.

(56) References Cited

U.S. PATENT DOCUMENTS

| 8,688,837 | B1 * | 4/2014 | Richardson | H04L 67/327 |
| | | | | 709/226 |
| 9,712,412 | B2 * | 7/2017 | Schlack | H04L 43/0817 |
| 9,819,760 | B2 * | 11/2017 | Akcin | H04L 67/2842 |
| 9,930,132 | B2 * | 3/2018 | Gupta | H04L 67/2842 |
| 10,021,212 | B1 * | 7/2018 | Desai | G06F 16/182 |
| 2003/0233423 | A1 * | 12/2003 | Dilley | H04L 29/06 |
| | | | | 709/214 |
| 2013/0086263 | A1 * | 4/2013 | Prasad | H04L 29/12066 |
| | | | | 709/224 |
| 2013/0326133 | A1 * | 12/2013 | Lee | G06F 17/30982 |
| | | | | 711/108 |
| 2014/0040412 | A1 * | 2/2014 | Yanagihara | H04L 67/2842 |
| | | | | 709/213 |
| 2015/0172224 | A1 * | 6/2015 | Zaifman | H04L 49/552 |
| | | | | 370/394 |

* cited by examiner

*Primary Examiner* — Thomas J Dailey
(74) *Attorney, Agent, or Firm* — Harness, Dickey & Pierce, P.L.C.

(57) ABSTRACT

A server and method for transmitting content to an end user are provided. The server receives information from a user terminal and transmits the content related to the user terminal to a cache server based, at least in part, on information received from the user terminal. Accordingly, the user terminal receives the content from the nearest cache server upon the request of the end user. The method according to the embodiments of the present invention is capable of providing content immediately to end users with low cache miss rate.

22 Claims, 12 Drawing Sheets

SERVER AND METHOD FOR PROVIDING CONTENT TO USERS

TECHNICAL FIELD

The present invention relates to a server and a method for providing content to users.

BACKGROUND OF THE DISCLOSURE

A variety of content distribution systems have been developed in the past. One such content distribution systems is a "content delivery network or "CDN". CDNs have been utilized by content providers on behalf of third parties. Specifically, CDNs have been used for storing, caching, or transmission of content such as web pages, streaming media and applications.

FIG. 1 is a schematic diagram illustrating a server (network) system 1 as the perspective view of the Pyramid comprising a Main server 2, a Root server 3, a Midgress server 4, an Edge server 5 and terminals 61 to 68.

The main server 2 is a controller and/or operator of this server system 1. It explicates that main server 2 will control the operation of the system from "Top to Bottom" by transmitting the instruction, content such as media content through server system 1. The Root server 3 is the top level server of a cache server. For example, the Root server 3 is installed in continental areas i.e. North America, South East Asia, and Europe etc., as Regional servers. The Routings of data (content) are performed based on a routing table and a DNS configuration on the network.

The Midgress server 4 is the middle level server of the cache server. For example, Midgress server 4 is installed in country areas i.e. USA, Japan, Taiwan, Thailand and etc., as Country servers. The Edge server 5 is the low level server of the cache server. Moreover, The Edge server 5 is the nearest server which user can receive and/or transmit the data (content) to the server system 1. For example, the Edge server 5 is installed in city areas, i.e. San Diego, Tokyo, Taipei, and Bangkok etc., as local servers. Terminals 61 to 68 comprise a desktop PC, a notebook PC, a mobile phone, a tablet, a smartphone and the like. Users or customers are able to communicate and/or receive and/or transmit data (content) with the server system 1 using these terminals. Terminals 61 to 68 are installed applications and are registered as system accounts and/or members of the server system 1.

The procedure of operation system can be explicated as following: First, the Main server 2 transmits an instruction or content to the Root server 3, then, the Root server 3 forwards the instruction or content to the Midgress server 4. Afterwards, the Midgress server 4 transmits the instruction or content to the Edge server 5, and at the end of process, the Edge server 5 transmits the content to the terminals 61 to 68. In other words, the Edge server 5 is the most appropriate server in terms of location, for example the nearest access server, to the terminals 61 to 68.

FIG. 2 is a schematic diagram illustrating a basic data flow in the server system 1 of FIG. 1. To show how the server system 1 operates according to the ideas of "Top to Bottom" through Multi-layer structure of a cache server. As shown in this figure, the Cache server 8 may include the Root server 3, the Midgress servers 41 to 42, and the Edge servers 51 to 54. In this way, "Data (Content) is transmitted to terminal users 1-8 via the Multi-layer structure of cache server 8". For example, the Root server 3 receives data (content) from an storage origin 7, then, the Root server 3 forwards the received data (content) to the Midgress servers 41 to 42. Afterwards, the Midgress servers 41 to 42 transmit the forwarded data (content) to the Edge servers 51 to 54. At the end of this process, terminals 61 and 62 may receive data (Content) from the Edge server 51. Terminals 63 and 64 may receive data (Content) from the Edge server 52. Terminals 65 and 66 may receive data (Content) from the Edge server 53. And, terminals 67 and 68 may receive data (Content) from the Edge server 54. This could also explain that each of the terminals 61-68 may receive data (content) from their nearest edge server.

It should be noted that the definition of the term "request" used in the present specification is "a request to confirm whether there is any message in the Main server 2". In a case where, there is a text message, the Main server 2 directly provides the text message to a terminal. On the other hand, if there is a request for content, the Main server 2 provides the terminal with a URL of the Storage origin 7 in which the content is stored. Thereby, the terminal accesses the Storage origin 7 thorough the CDN using the provided URL and gets the requested content stored therein.

FIG. 3 is a schematic diagram illustrating a prior art data flow diagram in the server system of FIG. 1, when a user requests data from the server system 1. In a case where the data is a text message, user No. 1 sends a request to the Main server 2 through the terminal 61. That is, user No. 1 confirms whether there is any message for the terminal 61 in the Main server 2. If there is any message, the Main server 2 will directly provide the message(s) to the terminal 61 based on the request (confirmation) of user No. 1. On the other hand, if the requested data is content(s) such as media content, the requested content which has been stored in the Storage origin 7 is provided to the terminal 61 via the cache server 8 when the Main server 2 receives the request from terminal 61. If the user No. 1 sends a request for content to the main server 2 through the terminal 61, the Main server 2 allows the Storage origin 7 to transmit the requested content to the terminal 61 via the Cache server (Multi-layers) 8. This may also be explained as follows: the Root server 3 receives the content from the Storage origin 7. Then, the Root server 3 forwards the content to the Midgress server 41. Afterwards, the Midgress server 41 transmits the content to the Edge server 51. At the end of process, the content is provided to the terminal 61 by the Edge server 51. During the process, cache of content is stored (cached) in each cache server, in which the content has been passed through.

When another user, i.e. No. 2, requests the same content thorough the terminal 62, the user No. 2 may receive the requested content from the Edge server No. 1 51. However, when another user, such as for example the user No. 8, requests the same content through the terminal 68, the route is longer, therefore the transmission takes longer time. For example, first, the terminal 68 accesses the Edge server 54 (No. 4). However, the edge server 54 (No. 4) fails to receive the content. Next, the edge server 54 (No. 4) will access the Midgress server 42 (No. 2).

In addition, when a user of any messenger service may access a group of cache servers for the first time to get a requested content, the user has to access the Storage origin 7 to receive the content. This is mainly due to the fact that the cache of content is not stored in the cache servers in the route of the user's request (continued to fail, that is, "cache miss"), and thus, it causes time delay to get the requested content.

SUMMARY OF THE INVENTION

Therefore, an object of the present invention is to provide a server and a method for providing content to users immediately with less cache miss.

In accordance with one aspect of the present invention, a method for providing content to a user includes the steps of receiving information from a terminal of the user and transmitting a cache of content related to the user to a cache server related to the terminal based on the information such that the terminal receive the cache content from the cache server upon the request of the user.

In accordance with a second aspect of the present invention, a server is provided for delivering content. The server includes information registration part for storing information received from a terminal of a user; and a transmission part that sends content related to the user to a cache server related to the terminal of the user.

In accordance with a third aspect of the present invention, a method for providing content to a user includes the steps of sending content associated with a user terminal to a cache server from a main server; storing the content in a content database of the cache server; and sending the content to the user terminal from the cache server based on a user request.

DETAILED DESCRIPTION OF THE INVENTION

The present invention describes in the detail below with the reference to the drawings. As those skilled in the art will recognize, the foregoing description merely refers examples of the invention for overview purposes. It is not limiting and the description may be realized in a variety of systems and methods.

Figure 1:
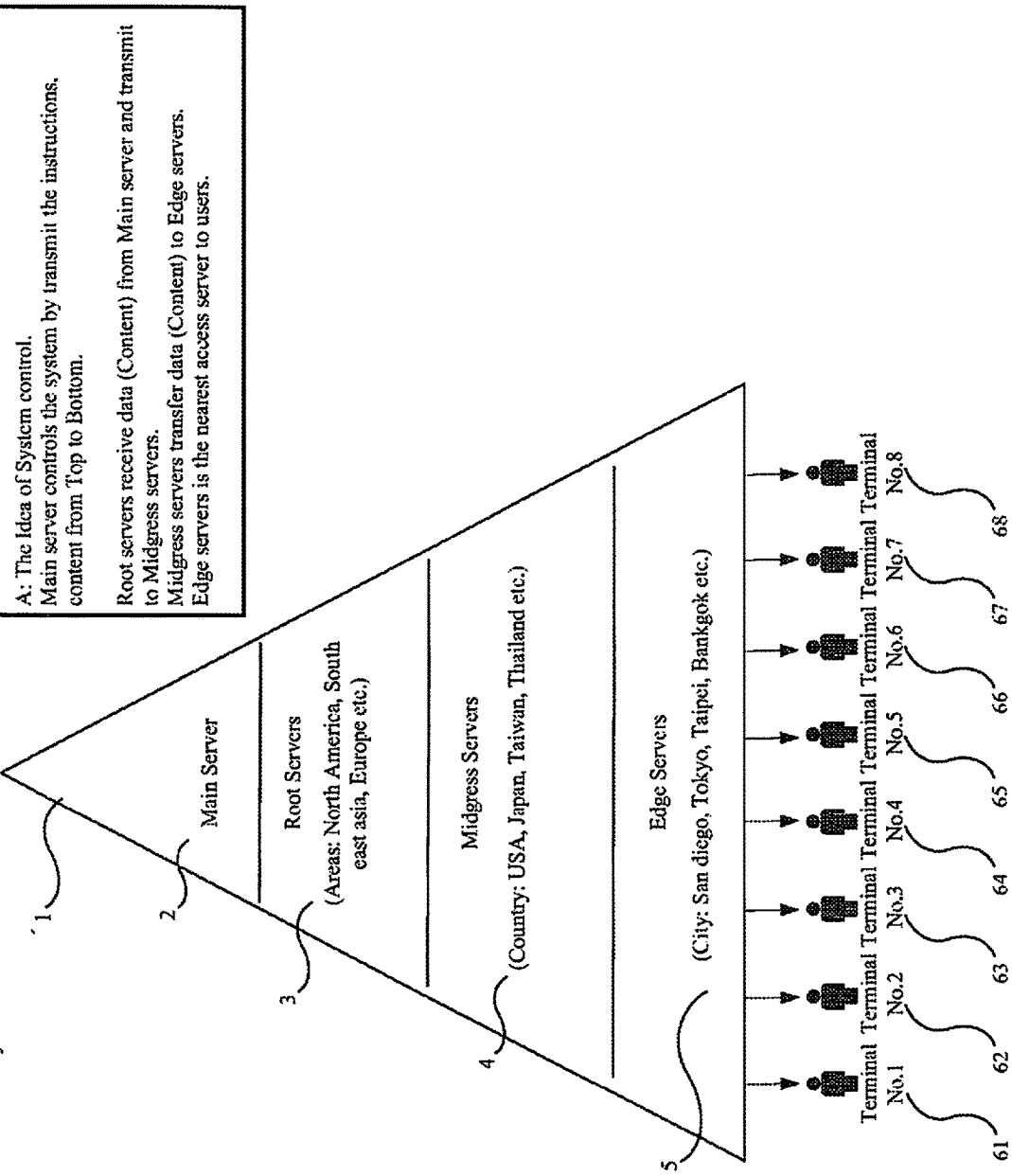
FIG. 1 is a schematic diagram illustrating a server (network) system.
Figure 2:
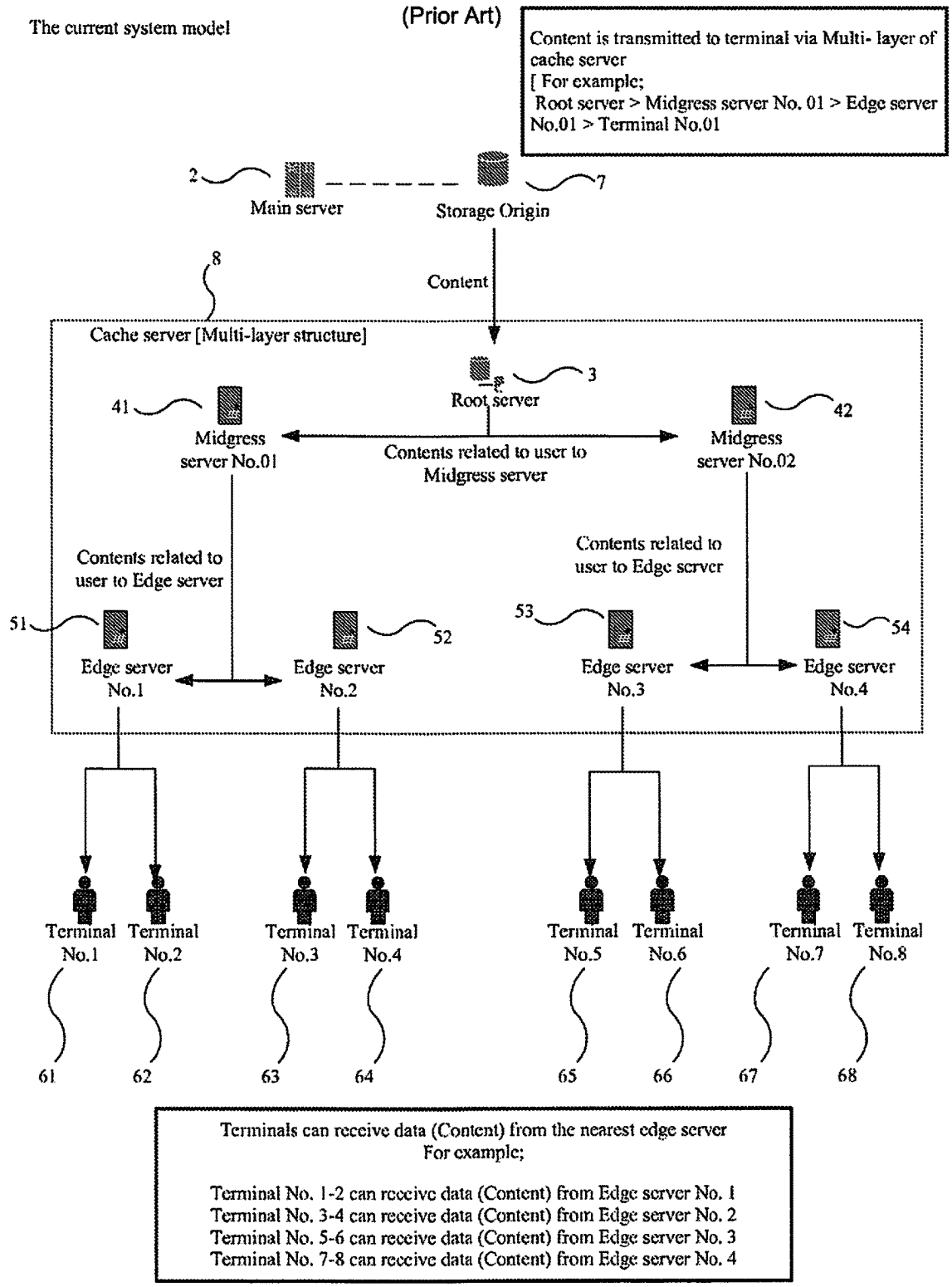
FIG. 2 is a schematic diagram illustrating a basic data flow in the server system of FIG. 1.
Figure 3:
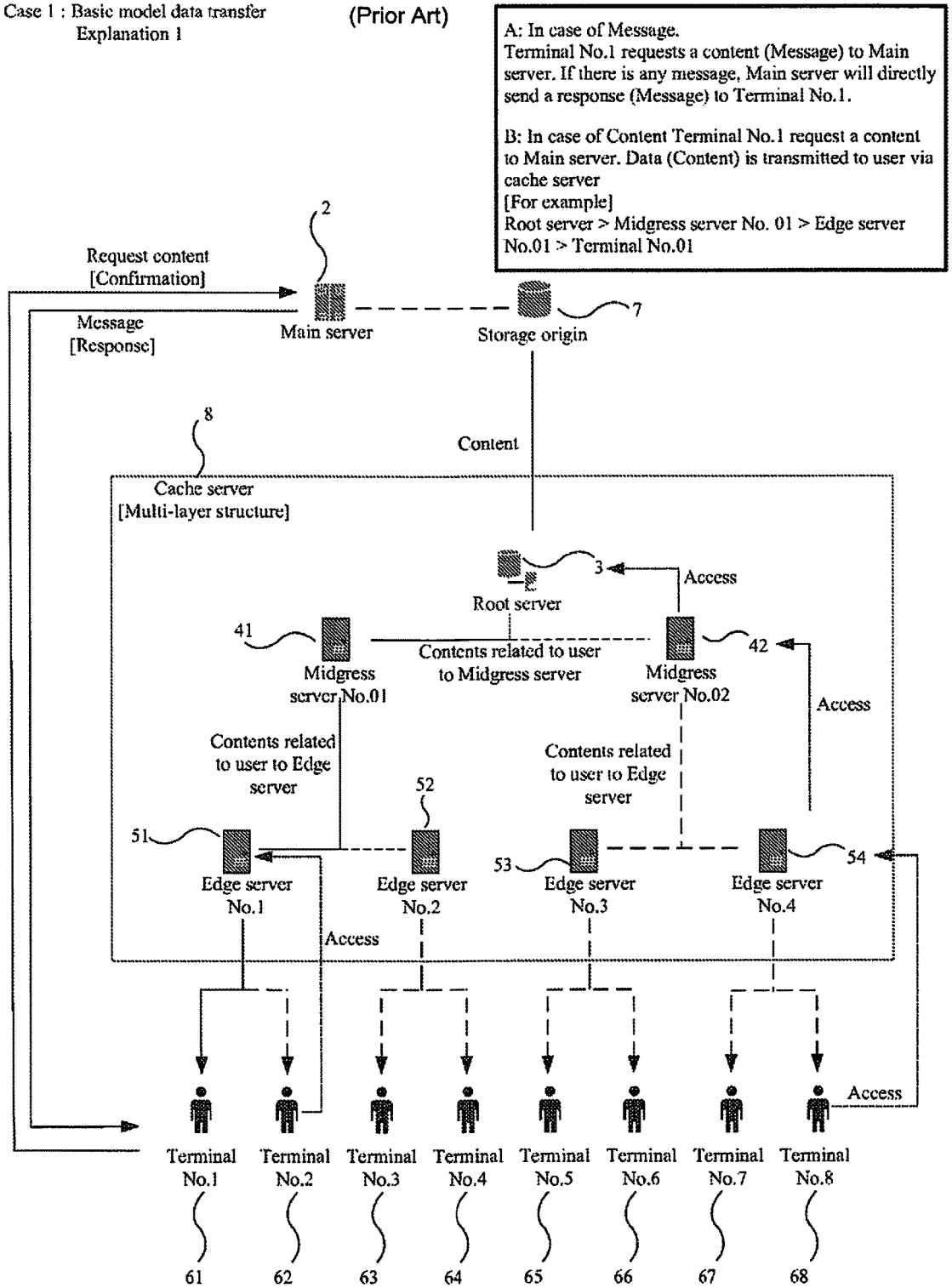
FIG. 3 is a schematic diagram illustrating a prior art data flow diagram in the server system of FIG. 1.
Figure 4:
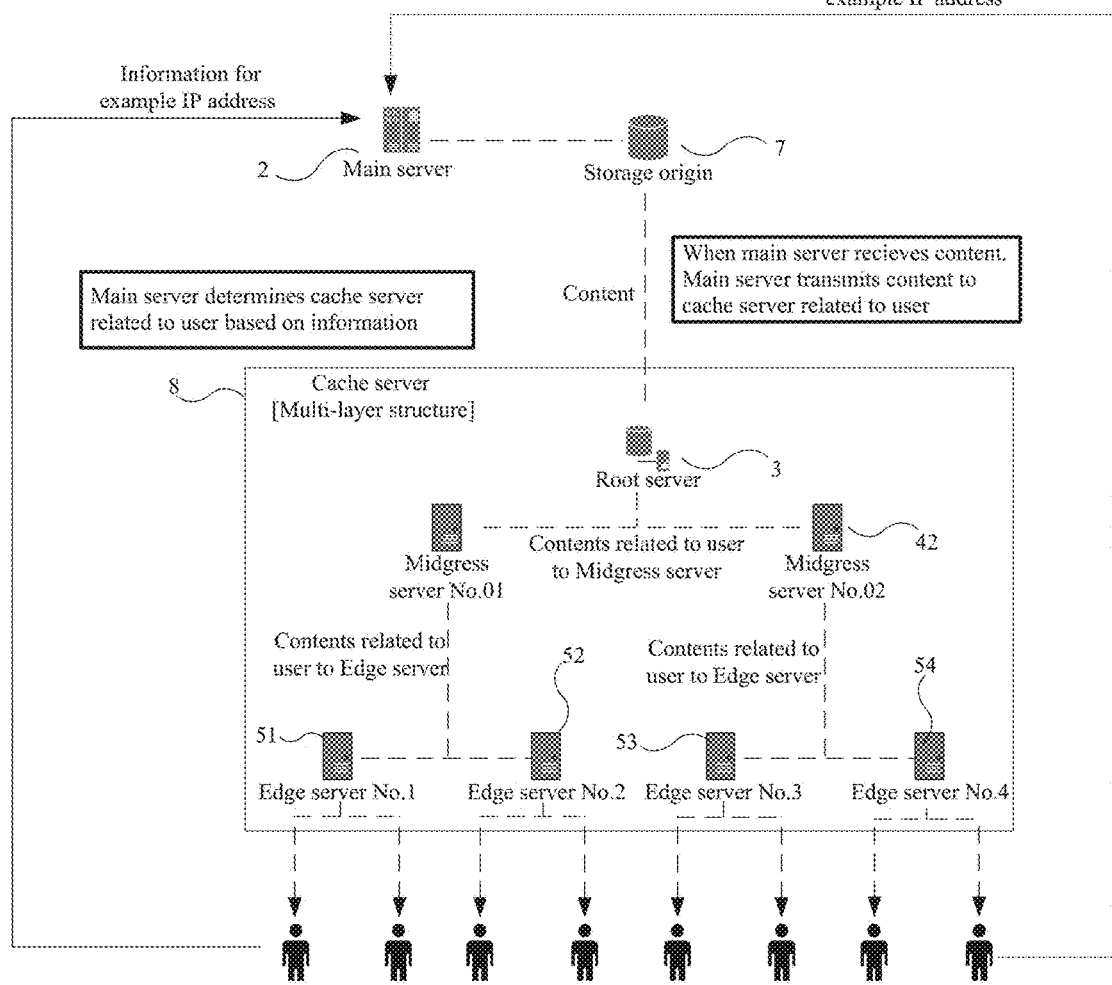
FIG. 4 is a schematic diagram illustrating an embodiment of data flow in the server system of FIG. 1.

FIG. 4 is a schematic diagram illustrating one embodiment of data flow diagram in the server system of FIG. 1, when an end user sends a request for content to the server system 1. The user terminal 61 also sends specific information to the Main server 2 with confirmation of message from the end user at the same time. The specific information may include identity information of the cache server in a network communicating to the terminal such as an IP address etc. The Main server 2 then receives the specific information from the user terminal 61, and will recognize the cache server, which is related to the user terminal 61.

Therefore, when the Storage origin 7 receives the content which will be sent to the user terminal 61 from another user or service provider, the Storage origin 7 transmits the content to the cache server related to the user terminal 61. Additionally, the Storage origin 7 transmits a content URL, which is linked to the Storage origin 7, to the Main server 2 before the user terminal 61 sends a request for message and/or content. For example, when the user terminal 61 sends a request for new message(s), the Main server 2 transmits the content URL to the user terminal 61 and the user terminal 61 will access the Storage origin 7 using the content URL. Finally, the content will be transmitted from the Storage origin 7 to the Root server 3, Midgress server 41 (No. 1), and Edge server 51 (No. 1) sequentially, and will be stored in each of the Root server 3, the Midgress server 41 (No. 1), and the Edge server 51 (No. 1) respectively. In this embodiment, the Edge server 51 (No. 1) is the nearest server which is located in direct contact with the user terminal 61 of the end user No. 1. Therefore, the user terminal 61 may receive immediately the requested content from the Edge server 51 (No. 1) without complicated routing upon receiving the user request from the end user No. 1, with a first attempt to download.

Similarly, each of the user terminals 62 to 68 may send information, such as for example IP address of each the Edge servers 51 to 54 with which they are in direct contact, to the Main server 2 with any request of message or content. It should be noted that the Main server 2 recognizes the cache server (Edge server) related to the user terminals 62 to 68, respectively.

Therefore, when the Storage origin 7 receives content which will be sent to the user terminals 62 to 68 from another user or service provider, the Storage origin 7 will transmit the content to the cache servers related to the user terminals 62 to 68, respectively. Additionally, the Storage origin 7 transmits the content URL which is linked to the Storage origin 7 to the Main server 2 before any of the user terminals 62 to 68 sends a request for message and/or content, respectively. For example, when the user terminals 62 to 68 sends a request for new message(s), the Main server 2 transmits the content URL to the user terminals 62 to 68 and the user terminals 62 to 68 may access the Storage origin 7 using the content URL.

Finally, when the Storage origin 7 receives content which will be sent to, for example, the user terminal 62, the content will be transmitted from the Storage origin 7 to the Root server 3, the Midgress server 41 (No. 1), and the Edge server 51 (No. 1) sequentially, and will be stored in each of the Root server 3, the Midgress server 41 (No. 1), and the Edge server 51 (No. 1) respectively. In this embodiment, the Edge server 51 (No. 1) is the nearest server which is in direct contact with the user terminal 62, end user No. 2 related to the content. Therefore, the user terminal 62 may receive the content from the Edge server 51 (No. 1) immediately without complicated routing upon receiving the request for content from the end user No. 2, with a first attempt to download.

In the same manner, when the Storage origin 7 receives content which will be sent to the user terminal 63 related to the end user No. 3 or the user terminal 64 related to the end user No. 4, the content will be transmitted from the Storage origin 7 to the Root server 3, the Midgress server 41 (No. 1), and the Edge server 52 (No. 2) sequentially, and will be stored in each of the Root server 3, the Midgress server 41 (No. 1), and the Edge server 52 (No. 2) respectively. In this embodiment, the Edge server 52 (No. 2) is the nearest server which is in direct contact with both of the user terminals 63 and 64 from the end users No. 3 and No. 4 related to the content. Therefore, the user terminals 63 and 64 may receive the content from the Edge server 52 (No. 2) immediately without complicated routing upon receiving the request for content from the end users No. 3 and No. 4, respectively, with a first attempt to download.

Furthermore, when the Storage origin 7 receives content which will be sent to the user terminal 65 related to the end user No. 5 or the user terminal 66 related to the end user No. 6, the content will be transmitted from the Storage origin 7 to the Root server 3, the Midgress server 42 (No. 2), the Edge server 53 (No. 3) sequentially, and will be stored in each of the Root server 3, the Midgress server 42 (No. 2), and the Edge server 53 (No. 3) respectively. In this embodiment, the Edge server 53 (No. 3) is the nearest server which is in direct contact with both of the user terminals 65 and 66 from the end users No. 5 and No. 6 related to the content. Therefore, the user terminals 65 and 66 may receive the content from the Edge server 53 (No. 3) immediately without complicated routing upon receiving the request for content from the end users No. 5 and No. 6, respectively, with a first attempt to download.

In addition, when the Storage origin 7 receives content which will be sent to the user terminal 67 related to the end user No. 7 or the user terminal 68 related to the end user No. 8, the content will be transmitted from the Storage origin 7 to the Root server 3, the Midgress server 42 (No. 2), the Edge server 54 (No. 4) sequentially, and will be stored in each of the Root server 3, the Midgress server 42 (No. 2), and the Edge server 54 (No. 4) respectively. In this embodiment, the Edge server 54 (No. 4) is the nearest server which is in direct contact with both of the user terminals 67 and 68 from the end users No. 7 and No. 8 related to the content. Therefore, the user terminals 67 and 68 may receive the content from the Edge server 54 (No. 4) immediately without complicated routing upon receiving the request for content from the end users No. 7 and No. 8, respectively, with a first attempt to download.

In another embodiment, the Main server 2 may receive location information of end users 1-8 from the user terminals 61-68, and determine the cache server which is most suitable for the specific user terminals. That is, the Main server 2 may determine IP address of an adequate edge server based on the location information of the end user.

In yet another embodiment, the information may include routes to the network and/or patterns of use. In this embodiment, the Main server 2 determines the cache server 8 related to the user terminal based on the received information from the user terminal. By way of examples, the routes to the network may include a WiFi network and a cellular network, e.g., 3G line. In a case where the end user changes the WiFi network and/or to the 3G line, the Main server 2 may determine the cache server related to the user terminal based on the information about the routes to the network. In this way, the user terminal can transmit the information of edge server with a request for the content or message to the Main server 2 only when the change occurs, such as for example when the end user moves to another location, and therefore, the network is changed, etc.

Patterns of use may include different user terminals such as, for example, personal computers (PCs), smartphones, or any other communication devices that may be used during day or night. For example, user terminals at office are used during the day, and other terminals at home are used during the night. In this embodiment, the Main server 2 may determine the cache server related to the user terminal based on information related to the patterns of use. The reception frequency of the information is not limited in particular. For example, the Main server 2 may receive the information from the user terminal periodically. However, in consideration of loads of the server, it is preferable to receive the information when a change of the information occurs.

Figure 5:
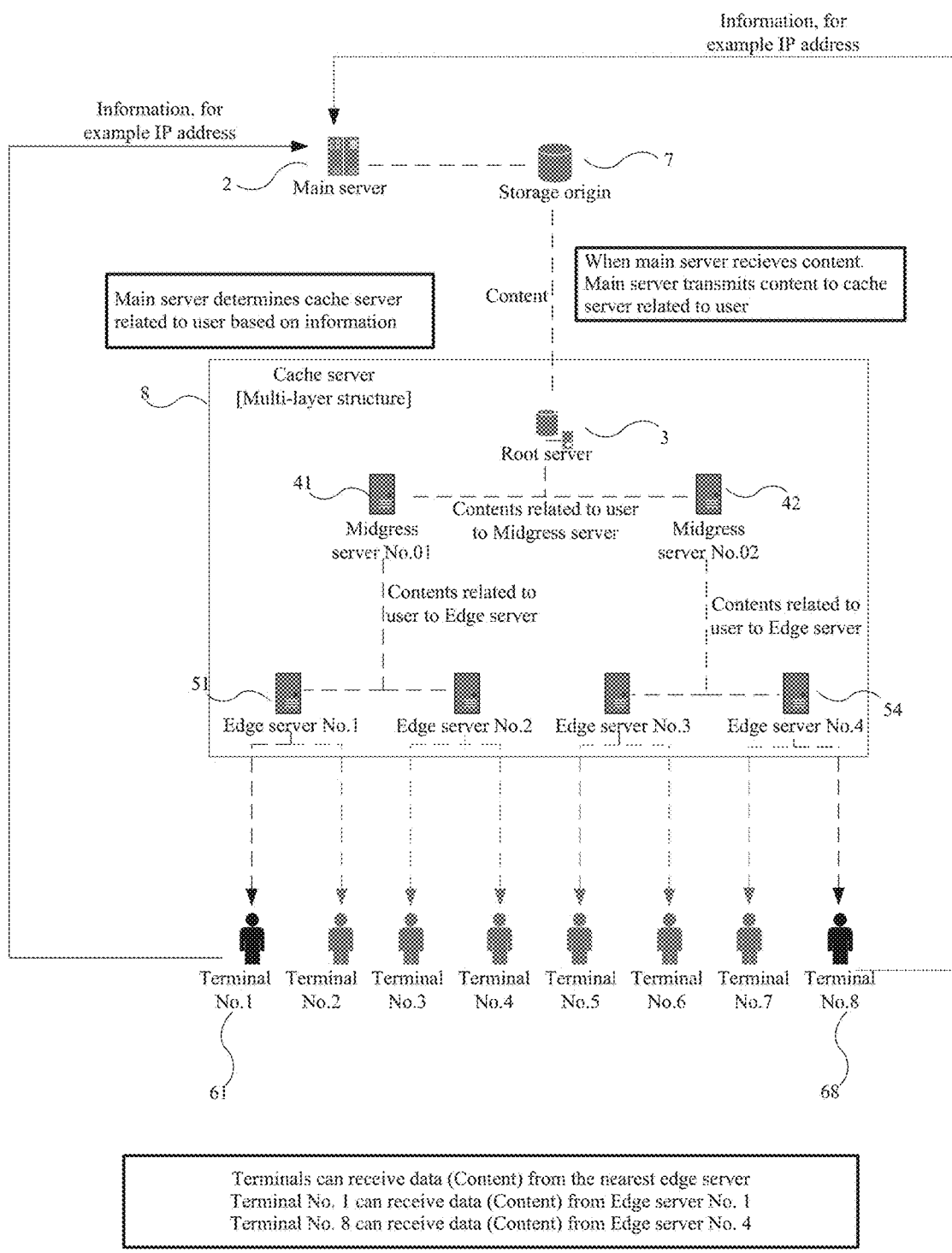
FIG. 5 is a schematic diagram illustrating another embodiment of data flow in the server system of FIG. 1.

FIG. 5 is a schematic diagram illustrating another embodiment of data flow in the server system of FIG. 1, when an end user requests content from the server system 1. In this embodiment, a case is explained there the Storage origin 7 receives content which would be sent to the end users No. 1 and No. 8. For example: the user terminals 61 and 68 send information such as, for example, the IP address of each of the Edge servers with which they are in direct contact with respect to Main server 2. The Main server 2, then, recognizes the cache server (Edge server) related to the user terminal 61 and the user terminal 68 based on the received information, respectively.

Therefore, when the Storage origin 7 receives content which would be sent to the user terminals 61 and 68 from another user or service provider, the Storage origin 7 transmits the content to the cache server related to the user terminal 61 and the user terminal 68, respectively. And, the Storage origin 7 transmits content URL which is linked to the Storage origin 7 to Main server 2 before the terminal 61 and terminal 68 send a request for message and/or content respectively. For example, when terminal 61 and terminal 68 request new message(s), Main server 2 transmits the content URL to the user terminal 61 and the user terminal 68. Then, the user terminals 61 and 68 access the Storage origin 7 through the content URL.

Finally, the content is transmitted from the storage origin 7 to the Root server 3, the Midgress server 41 (No. 1), and the Edge server 51 (No. 1) sequentially, and will be stored in each of the Root server 3, the Midgress server 41 (No. 1), and the Edge server 51 (No. 1) respectively. In this embodiment, the Edge server 51 (No. 1) is the nearest edge server or in direct contact with the user terminal 61. Furthermore, the content is transmitted from the storage origin 7 to the Root server 3, the Midgress server 42 (No. 2), and the Edge server 54 (No. 4) sequentially, and stored in each of the Root server 3, the Midgress server 42 (No. 2), and the Edge server 54 (No. 4) respectively. In this embodiment, the Edge server 54 (No. 4) is the nearest edge server or is in direct contact with the user terminal 68. Therefore, the user terminal 61 can receive the content from the Edge server 51 (No. 1) immediately without complicated routing upon receiving the request from the user No. 1 with the first attempt for download. And, the user terminal 68 can receive the content from the Edge server 54 (No. 4) and immediately without complicated routing upon receiving the request from the user No. 8, with the first attempt for download.

Figure 6:
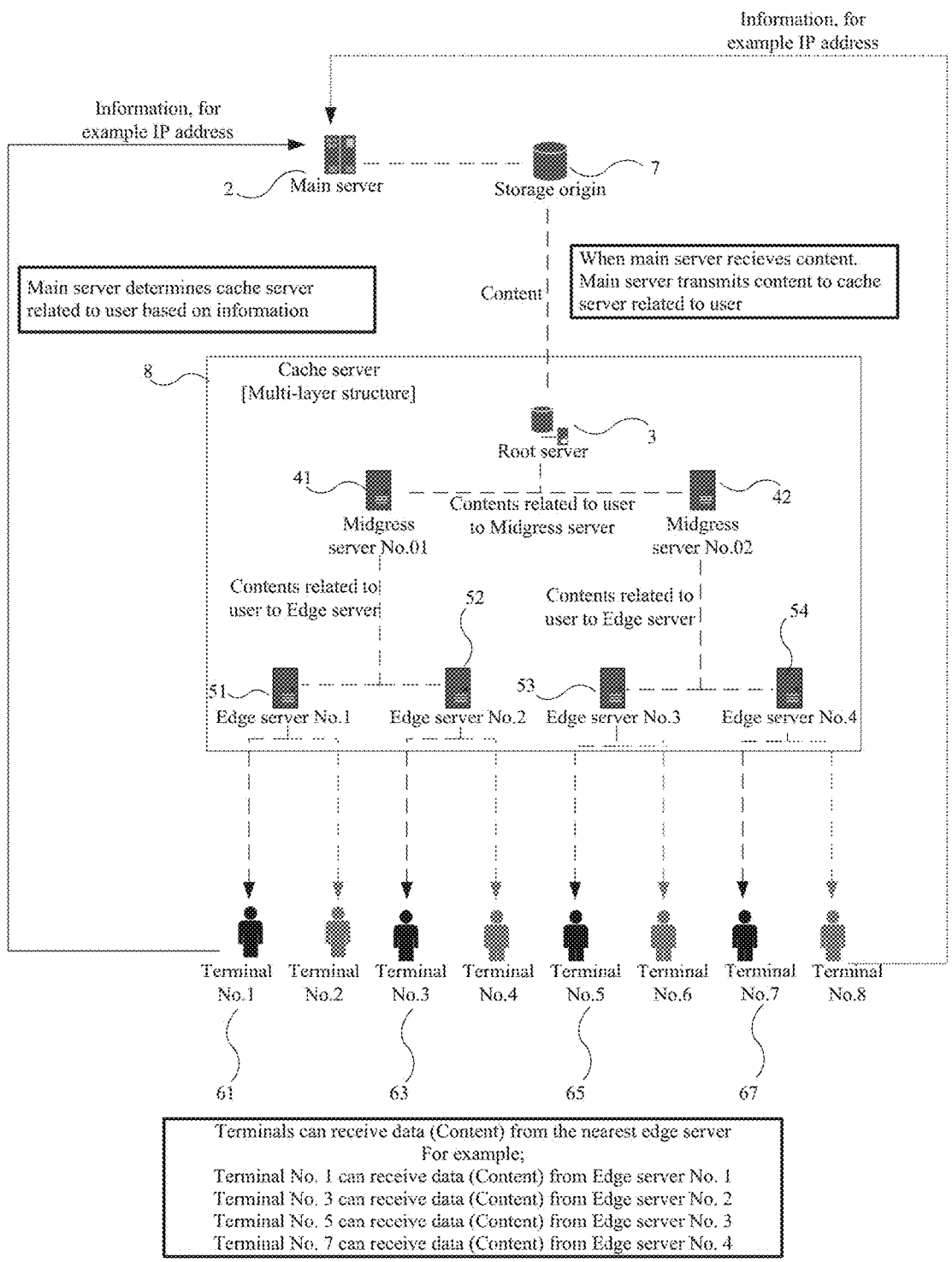
FIG. 6 is a schematic diagram illustrating yet another embodiment of data flow in the server system of FIG. 1.

FIG. 6 is a schematic diagram illustrating another embodiment of data flow in the server system of FIG. 1, when an end user requests content from the Main server 2. In this embodiment, the Storage origin 7 receives content which would be sent to the end user No. 1, end user No. 3, end user No. 5, and the end user No. 7. For example, it is assumed that in this embodiment, the end users No. 1, No. 3, No. 5 and No. 7 belong to the same SNS group, or enroll in the same account for the corporate advertising. By way of example, the user terminals 61, 63, 65 and 67 send information such as the IP address of each of Edge servers with which they are in direct contact to the Main server 2. The Main server 2, then, recognizes the cache server (Edge server) related to the user terminals 61, 63, 65, and 67 based on the information, respectively.

Therefore, when the Storage origin 7 receives content which would be sent to user terminal 61, 63, 65, and 67 from another end user or service provider, the Storage origin 7 transmits the content to the cache server related to user terminals 61, 63, 65, and 67, respectively. And, the Storage origin 7 transmits content URL which is linked to the Storage origin 7 to the Main server 2 before the user terminals 61, 63, 65, and 67 request message and/or content respectively. For example, when the user terminals 61, 63, 65, and 67 request a new message(s), the Main server 2 transmits the content URL to the user terminal 61, 63, 65, and 67. And the user terminals 61, 63, 65, and 67 access the Storage origin 7 through the content URL.

Finally, the content is transmitted from the Storage origin 7 to the Root server 3, the Midgress server 41 (No. 1), and the Edge server 51 (No. 1) sequentially, and will be stored in each of the Root server 3, the Midgress server 41 (No. 1), and the Edge server 51 (No. 1) respectively. In this embodiment, the Edge server 51 (No. 1) is the nearest edge server or the one with direct contact with the user terminal 61. And, the content is transmitted from the storage origin 7 to the Root server 3, the Midgress server 41 (No. 1), and the Edge server 52 (No. 2) sequentially, and will be stored in each of the Root server 3, the Midgress server 41 (No. 1), and the Edge server 52 (No. 2). In this embodiment, the Edge server 52 (No. 2) is the nearest edge server or the one in direct contact with the user terminal 63. In addition, the content is transmitted from the Storage origin 7 to the Root server 3, the Midgress server 42 (No. 2), and the Edge server 53 (No. 3) sequentially, and will be stored in each of the Root server 3, the Midgress server 42 (No. 2), and the Edge server 53 (No. 3). In this embodiment, Edge server 53 (No. 3) is the nearest edge server or the one in direct contact with the user terminal 65. Furthermore, the content is transmitted from the Storage origin 7 to the Root server 3, the Midgress server 42 (No. 2), and the Edge server 54 (No. 4) sequentially, and will be stored in each of the Root server 3, the Midgress server 42 (No. 2), and the Edge server 54 (No. 4). In this embodiment, the Edge server 54 (No. 4) is the nearest edge server or the one in direct contact with the user terminal 67.

Therefore, the user terminal 61 can receive the content from the Edge server 51 (No. 1) immediately without complicated routing upon receiving the request of end user No. 1, with the first attempt for download. Thus, the terminal 63 can receive the content from the Edge server 52 (No. 2) immediately without complicated routing upon receiving the request from the end user No. 3, with the first attempt for download. Terminal 65 can receive the content from the Edge server 53 (No. 3) immediately without complicated routing upon receiving the request from the end user No. 5, with the first attempt for download. And, terminal 67 can receive the content from the Edge server 54 (No. 4) and immediately without complicated routing upon receiving the request from the end user No. 7, with the first attempt for download.

Figure 7:
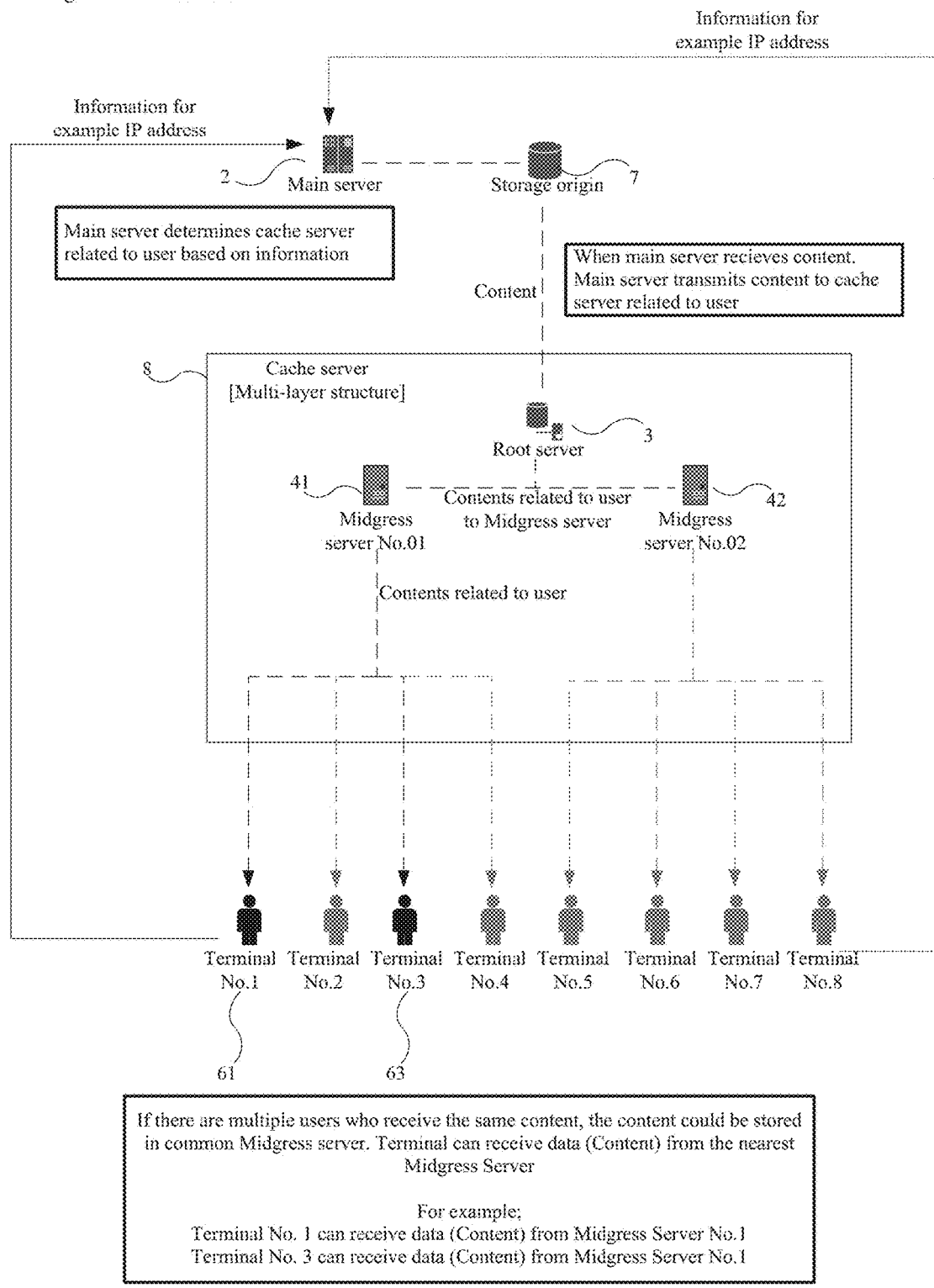
FIG. 7 is a schematic diagram illustrating yet another embodiment of data flow in the server system of FIG. 1.

FIG. 7 is a schematic diagram illustrating yet another embodiment of data flow in the server system of FIG. 1, where there are multiple users who receive the same content, and the content may be stored a in common Midgress server. In this embodiment, the Storage origin 7 receives content related to the end users No. 1 and No. 3. For example, the user terminals 61 and 63 send information such as IP address of each of the Edge servers with which they are in direct contact to the Main server 2. The Main server 2 recognizes the cache server (Edge server) related to the user terminals 61 and 63 based on the received information, respectively. Therefore, when the Storage origin 7 receives the content related to the user terminals 61 and 63 from another end user or service provider, the Main server 2 transmits the content to the cache server related to the user terminals 61 and 63.

For example, the content is transmitted from the Storage origin 7 to the Root server 3, the Midgress server 41 (No. 1), sequentially, and will be stored in the Root server 3, and the Midgress server 41 (No. 1). In this embodiment, the Midgress server 41 (No. 1) is the common midgress server of user terminals 61 and 63 from the end users No. 1 and No. 3 related to the content. Therefore, the user terminals 61 and 63 can receive the content from the Midgress server 41 (No. 1) immediately without complicated routing upon receiving the request from the end user No. 1 and No. 3. If the number of users receiving the content is large, it is possible to store the content in the midgress server as explained in the present embodiment, and not stored in each of the edge servers related to each user terminals. In this embodiment, the Main server 2 decides the most appropriate midgress server related to user terminals 61 and 63 based on the received information, and the content is subsequently stored in the midgress server.

Figure 8:
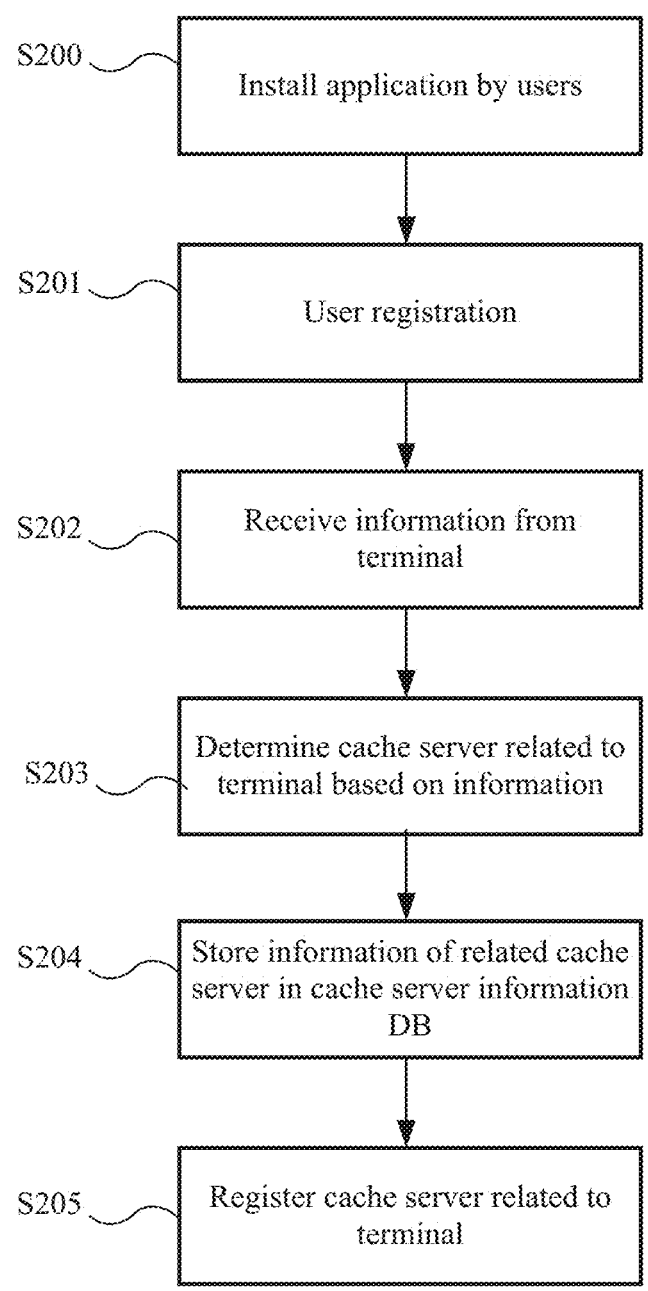
FIG. 8 is a flowchart illustrating operation steps of a main server.
Figure 9:
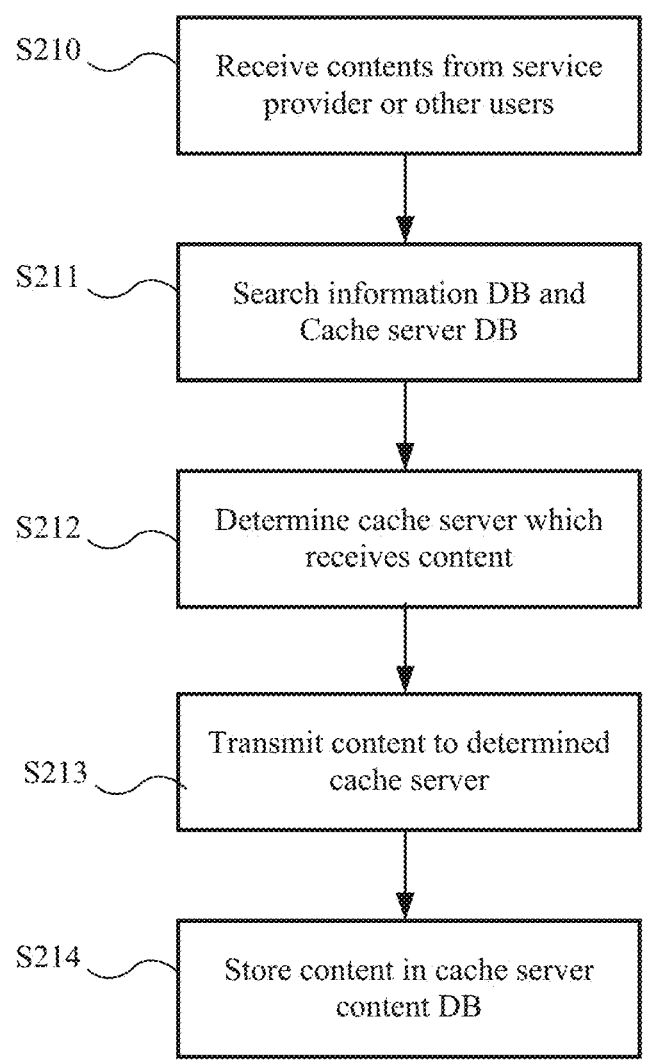
FIG. 9 is a flowchart illustrating operation steps of the main server after the flow of FIG. 8.
Figure 11:
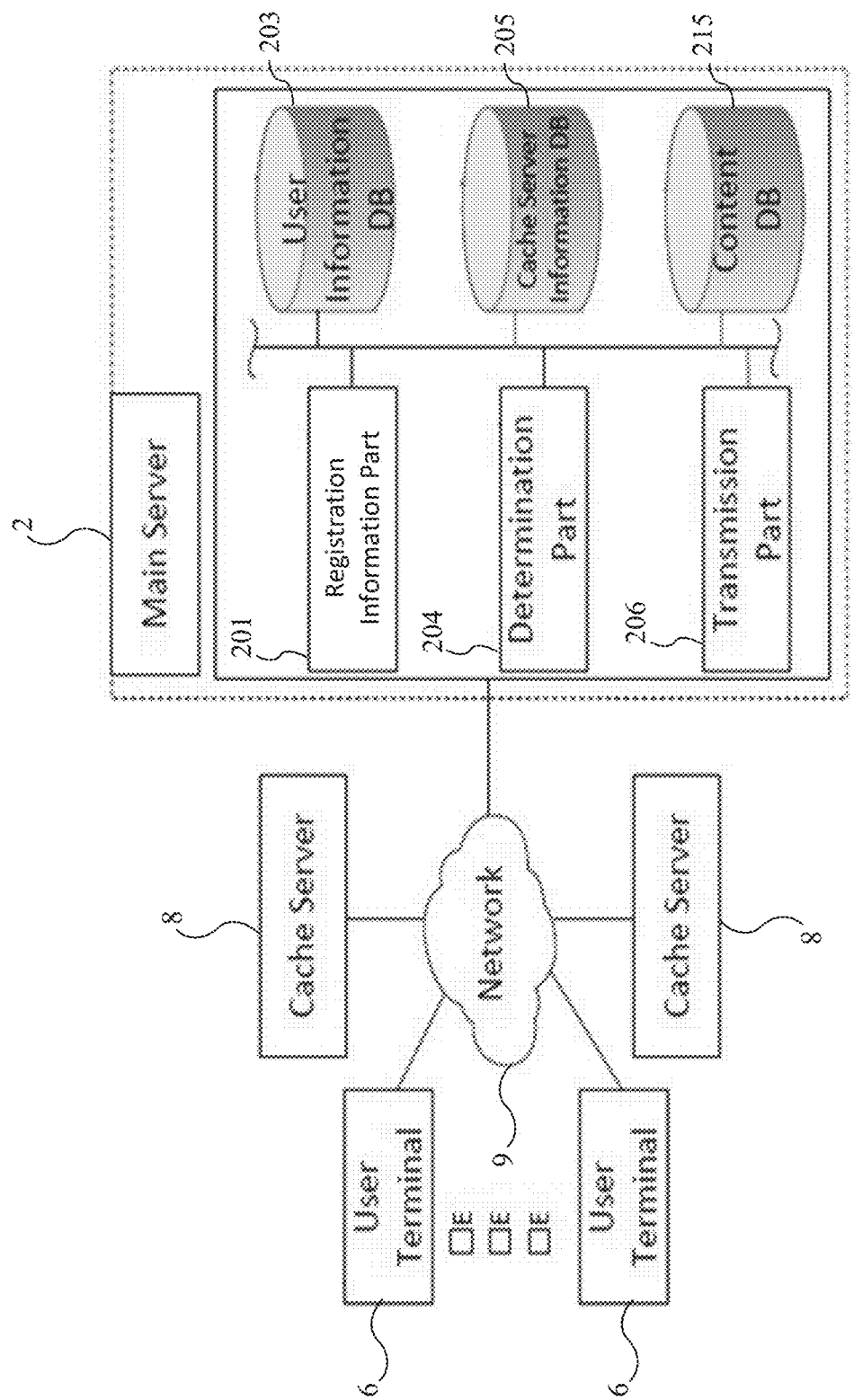
FIG. 11 is a block diagram illustrating a configuration of a main server.

FIG. 11 is a block diagram illustrating a configuration of an embodiment of the Main server 2. And, FIG. 8 and FIG. 9 are a flowchart illustrating operation steps of the Main server 2. In this embodiment, as shown in FIG. 11, the Main server 2 may include a Registration Information part 201, a Determination Part 204, a Transmission part 206, a user information database 203, a cache server information database 205, and a content database 215. As shown in FIG. 8, an end user installs an application for the content delivery system through a user terminal at the first step (S200). If the end user successfully installs the application into the user terminal 6, the user registration is implemented (S201) and a user account is created. The user registration is implemented by the Registration Information part 201, and then, the information of registered user is stored in the user information database 203 of FIG. 11.

Next, the Main server 2 receives the information from the user terminal (S202). If the information is related to identity information of the cache server in a network in communication with the user terminal, such as for example an IP address, the Main server 2 stores the information of the related cache server in the cache server information database 205 of FIG. 11 (S204). In such a case, the operation of step S203 is unnecessary. On the other hand, if the information is related to routes to the network or patterns of use, etc., the Main server 2 will determine the cache server related to each user terminal based on the received information (S203). This determination step is implemented by determination part 204 of the Main server 2. Thereafter, the Main server 2 stores the information of the related cache server in the cache server information database 205 (S205). At the end of step, the Main server 2 will register the determined cache server which is related to the user terminal.

FIG. 9 is a flowchart illustrating operation steps of Main server 2 after the flow diagram of FIG. 8. At first, the Main server 2 receives a content from a service provider or other users (S210) and the content is then stored in the content database 215 (Storage origin 7) of the Main server 2. Thereafter, the Main server 2 searches user the information database 203 and the cache server database 205 (S211). Then, the Main server 2 determines the cache server which receives the content (S212). These steps are implemented by determination part 204 of the Main server 2. Accordingly, the Main server 2 transmits the related content to the determined cache server 8 (S213). And subsequently, the content is stored in the content database 804 of the cache server 8.

Figure 10:
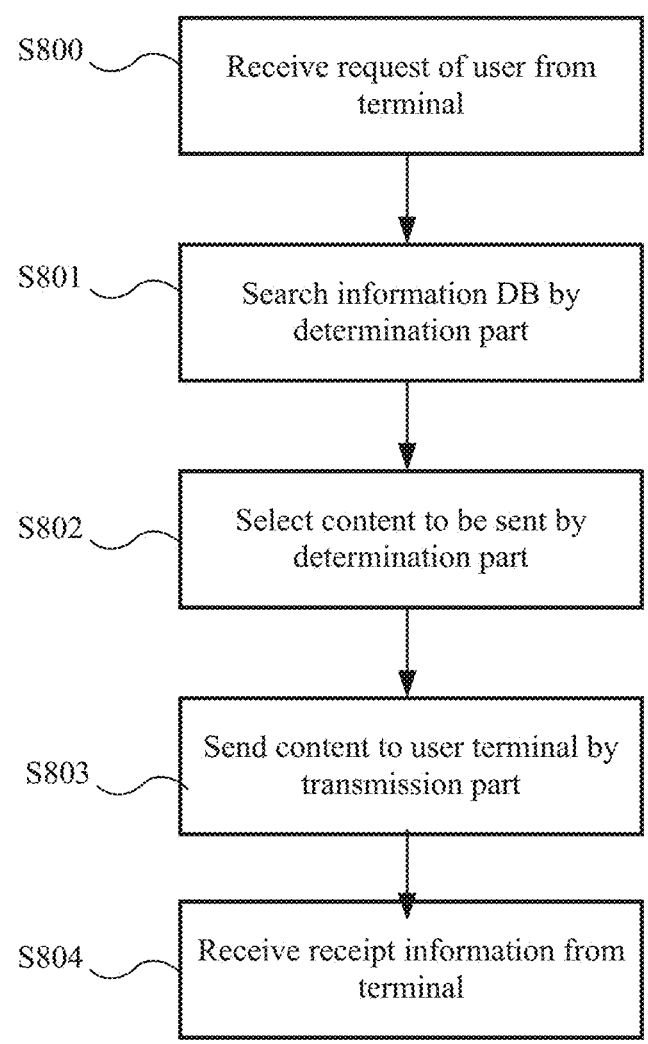
FIG. 10 is a flowchart illustrating operation steps of a cache server.
Figure 12:
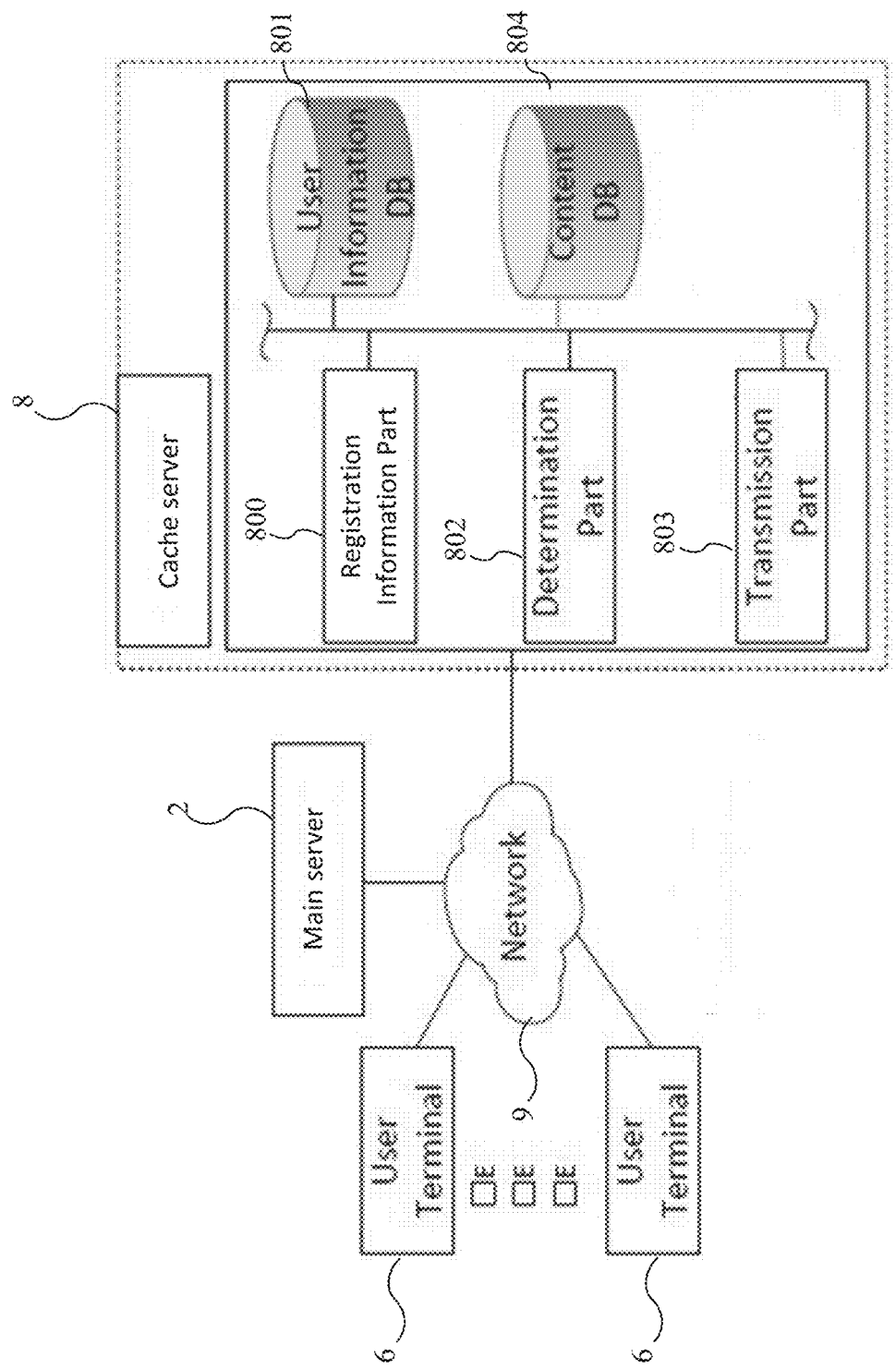
FIG. 12 is a block diagram illustrating a configuration of a cache server.

FIG. 12 is a block diagram illustrating a configuration of a cache server. And, FIG. 10 is a flowchart illustrating operation steps of the cache server. In this embodiment, as shown in FIG. 12, the cache server 8 may include a Registration Information part 800, a Determination Part 802, Transmission part 802, user information database 801, and a content database 804. As shown in FIG. 10, the cache server 8 receives a request from the end user of user terminal 6 (S800). Then, the determination part 802 of the cache server 8 performs a search within the information database 801 (S801), and selects the content which will be sent to the end user from the content database 804 (S802). Thereafter, the transmission part 803 of cache server 8 sends the selected content, stored in content database 804, to the user terminal 6 of the related end user (S803).

What is claimed is:

1. A method for providing content to an end user, the method comprising:
   receiving, by a main server, a user's request for a text message including specific information from a user terminal without passing through any cache server, the specific information including routes to a network and patterns of use of the user terminal;
   recognizing, by the main server, a cache server related to the user terminal based on the specific information;
   receiving, by the main server, a request for content from the user terminal without passing through the cache server;
   enabling, by the main server, transmission of a cache content requested to the cache server based, at least in part, on the specific information such that the user terminal receives the cache content through the cache server upon receiving the request for content,
   receiving a content URL before receiving the user's request for the text message;
   transmitting the content URL to the user terminal without passing through the cache server upon receiving the user's request for the text message; and
   causing the user terminal to access a storage via the cache server for the content using the content URL,
   wherein the routes to the network includes information regarding a change of network environments between different network environments, and
   the patterns of use includes usage of the user terminal during a first time frame in a first location, and usage of the user terminal during a second time frame in a second location.

2. The method according to claim 1, wherein the specific information comprises identity information of the cache server within the network in communication with the user terminal.

3. The method according to claim 1, wherein the different network environments include a WiFi network and a cellular network.

4. The method according to claim 1, further comprising:
   determining the cache server related to the user terminal based on the specific information,
   wherein the receiving the user's request for the text message including the specific information is implemented in response to a change of information occurring.

5. The method according to claim 4, wherein the determining comprises,
   locating one in direct connection with the user terminal from among a plurality of cache servers as the cache server, and
   locating a nearest one to the user terminal from among the plurality of cache servers as the cache server in response to there being no cache server in direct connection with the user terminal.

6. The method according to claim 1, wherein the enabling includes enabling transmission of the cache content requested to the cache server related to the user terminal from another user terminal different from the user terminal.

7. The method according to claim 1, wherein the enabling includes enabling transmission of the cache content requested to the cache server related to the user terminal from a service provider.

8. The method according to claim 1, wherein the cache content comprises advertisements.

9. The method according to claim 1, wherein the cache server has a multi-layer structure comprising a root server, a plurality of midgress servers, and a plurality of edge servers.

10. The method according to claim 9, wherein the enabling includes enabling transmission of the cache content requested from the root server to one of the plurality of midgress servers.

11. The method according to claim 9, wherein the enabling further includes enabling transmission of the cache content requested to one of the plurality of edge servers that is nearest to the user terminal requesting the content.

12. A server comprising:
   a memory configured to store computer-readable instructions; and
   one or more processors configured to execute the computer-readable instructions such that the one or more processors are configured to,
      receive a user's request for a text message including information from a user terminal without passing through any cache server,
      store the information received from the user terminal, the information including routes to a network and patterns of use of the user terminal,
      recognize a cache server related to the user terminal based on the information,
      receive a request for content from the user terminal without passing through the cache server, and
      enable transmission of content requested by the user terminal to the cache server based on the information,
   wherein the routes to the network includes information regarding a change of network environments between different network environments,
   the patterns of use includes usage of the user terminal during a first time frame in a first location, and usage of the user terminal during a second time frame in a second location, and
   the one or more processors are further configured to,
      receive a content URL from a storage before receiving the user's request for the text message,
      transmit the content URL to the user terminal without passing through the cache server upon receiving the user's request for the text message, and
      cause the user terminal to access the storage via the cache server for the content using the content URL.

13. The server according to claim 12, wherein the one or more processors are further configured to receive and update the information in response to the user terminal entering one of the different network environments.

14. The server according to claim 12, wherein the one or more processors are further configured to locate the cache server related to the user terminal based, at least in part, on the information.

15. The server according to claim 12, wherein the cache server has a multi-layer structure comprising a root server, a plurality of midgress servers, and a plurality of edge servers.

16. The server according to claim 15, wherein the one or more processors are further configured to send the content requested by the user terminal from the root sever to one of the plurality of midgress servers based, at least in part, on the information.

17. The server according to claim 16, wherein the one or more processors are further configured to send the content requested by the user terminal from the one of the plurality of midgress servers to one of the plurality of edge servers based, at least in part, on the information.

18. A method for providing content to an end user, the method comprising:
    receiving, by a main server, a user's request for a text message including specific information from a user terminal without passing through any cache server, the specific information including routes to a network and patterns of use of the user terminal;
    recognizing, by the main server, a cache server related to the user terminal based on the specific information;
    receiving, by the main server, a request for the content from the user terminal without passing through the cache server;
    enabling, by the main server, transmission of the content requested from the main server to the cache server such that the content is stored in a content database within the cache server;
    enabling transmission of the content stored in the content database from the cache server to the user terminal in response to receiving the request for content from the user terminal;
    receiving a content URL from the content database before receiving the user's request for the text message;
    transmitting the content URL to the user terminal without passing through the cache server upon receiving the user's request for the text message; and
    causing the user terminal to access the content database via the cache server for the content using the content URL,
    wherein the routes to the network includes information regarding a change of network environments between different network environments, and
    the patterns of use includes usage of the user terminal during a first time frame in a first location, and usage of the user terminal during a second time frame in a second location.

19. The method according to claim 18, wherein
    the cache server has a multi-layer structure comprising a root server, a plurality of midgress servers, and a plurality of edge servers, and
    the enabling includes enabling transmission of the content requested from the root server to one of the plurality of midgress servers based on the specific information received from the user terminal.

20. The method according to claim 19, wherein the enabling further includes enabling transmission of the content from the one of the plurality of midgress servers to one of the plurality of edge servers based on the specific information received from the user terminal.

21. The method according to claim 1, wherein the recognizing includes acquiring address information associated with the cache server based on the specific information.

22. The method according to claim 1, wherein the routes to the network includes information regarding the change of the network environments in response to the network environments changing between different network environments by recognizing a location of the user terminal based on the user's request for the text message.

* * * * *